Patented June 1, 1948

2,442,547

UNITED STATES PATENT OFFICE 2,442,547

METHOD OF PRODUCING IMINODI-ACETONITRILE

Jerome L. Mostek, Berwyn, Ill., assignor to Sinclair Refining Company, New York, N. Y., a corporation of Maine No Drawing. Application May 7, 1946, Serial No. 668,021

1 Claim. (Cl. 260—464)

This invention relates to a new process for the production of iminodiacetonitrile.

In accordance with the present invention, iminodiacetonitrile is produced by the treatment of monochloracetonitrile with dry, gaseous ammonia, with or without the use of an inert solvent such as ether, benzene or petroleum naphtha. The reaction is conveniently carried out at ordinary temperature, such as room temperatures, although as it is exothermic the temperature of the reaction mixture will ordinarily increase somewhat when the ammonia is brought into contact with the monochloracetonitrile. The amount of ammonia used is substantially in excess of that theoretically required to form the iminodiacetonitrile, because the reaction is one which results in dehydrochlorination of the monochloracetonitrile with formation of ammonium chloride, and sufficient ammonia must be supplied for this.

The invention will be illustrated by the following example but it is not limited thereto.

*Example.*—100 parts of monochloracetonitrile were placed in a vessel provided with a stirrer, thermometer and gas inlet tube. Dry gaseous ammonia was passed into the vessel and the liquid was stirred. The temperature rose to 40° C. very quickly. After about ½ hour a solid was formed which precipitated from the liquid. The passage of ammonia was continued until the contents solidified in this case requiring a total of 10 hours. During most of this time the temperature was from 25–30° C. Absolute alcohol was then added to the reaction mass and the resulting mixture warmed and filtered to remove the ammonium chloride. Ether was then added to the filtrate, which was placed in the refrigerator overnight. The crystals which came out of the solution were removed by filtration and the filtrate treated to recover more of the product. Iminodiacetonitrile was obtained in a yield of 35% and was purified by recrystallization from alcohol and ether.

I claim:

The process of producing iminodiacetonitrile which comprises bringing dry gaseous ammonia into contact with monochloracetonitrile.

JEROME L. MOSTEK.

REFERENCES CITED

The following references are of record in the file of this patent:

UNITED STATES PATENTS

| Number | Name | Date |
|---|---|---|
| 2,163,594 | Engels et al. | June 27, 1939 |
| 2,239,617 | Moore | Apr. 22, 1941 |

OTHER REFERENCES

Heintz, Liebig's Annalen, vol. 145, pages 49–52 (1868).

Eschweiler, Liebig's Annalen, vol. 278, pages 230–238 (1894).